July 13, 1954   J. W. HOWLETT ET AL   2,683,295
LADLE TRUCK, PARTICULARLY FOR FOUNDRY USE
Filed May 11, 1950
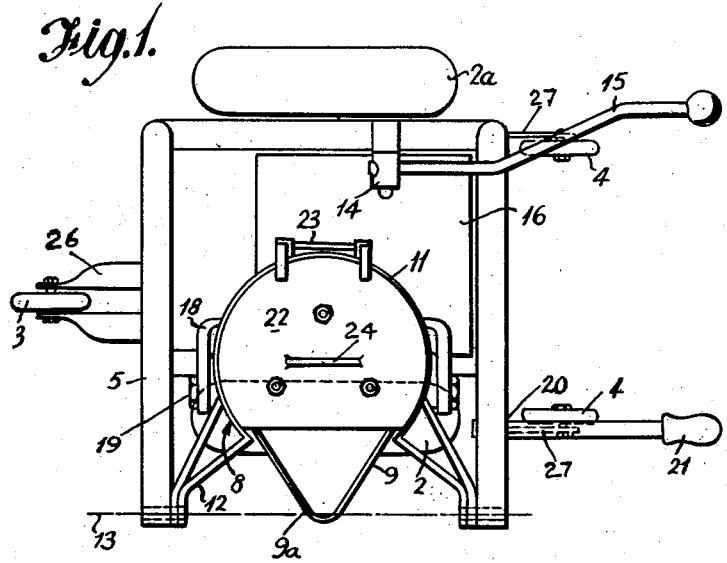
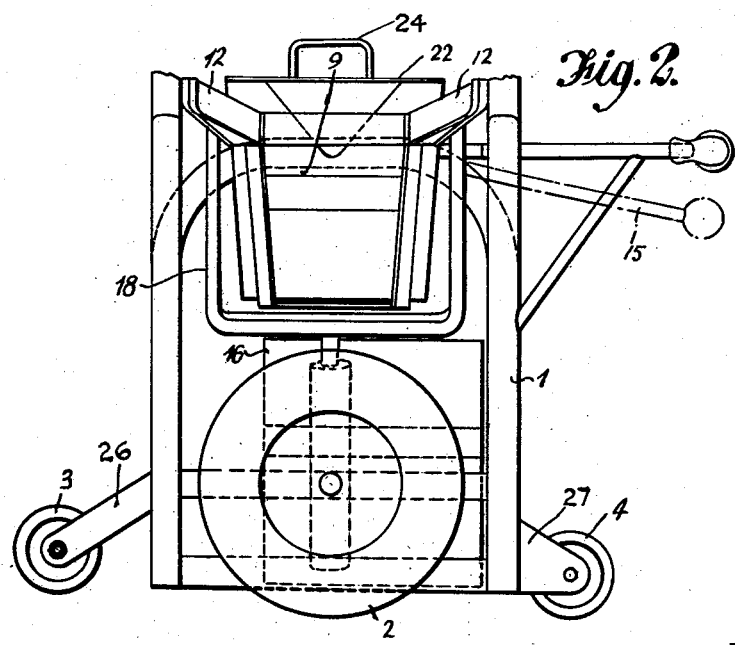
Inventors:
John W. Howlett
and Horace E. James
By
Attorneys.

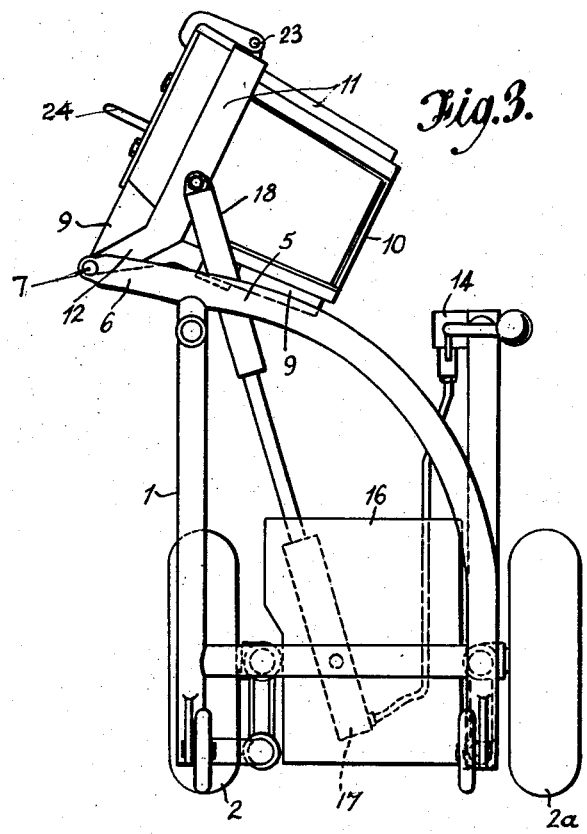

Patented July 13, 1954

2,683,295

UNITED STATES PATENT OFFICE 2,683,295

LADLE TRUCK, PARTICULARLY FOR FOUNDRY USE

John William Howlett and Horace E. James, Lymington, England

Application May 11, 1950, Serial No. 161,332

4 Claims. (Cl. 22—82)

1

This invention relates to ladle trucks for foundry use and has for an object to provide an improved ladle truck by means of which a ladle filled with molten metal can be conveniently moved from place to place in a metal foundry and tilted when required to pour metal into a mould.

According to one aspect of the invention the ladle is tiltably supported in a wheeled frame, preferably having rubber-tyred wheels, the tilting axis of the ladle preferably extending in the direction of movement of the truck.

The truck may be constructed as a trolley freely movable over the foundry floor. A pair of rubber-tyred main wheels may be arranged with their common axis in a transverse plane through the spout of the ladle so as to normally carry substantially the whole weight of the trolley and its contents, an auxiliary wheel or wheels being arranged in front and another auxiliary wheel or wheels to the rear of these main wheels so that when the trolley stands on a plane surface, it is possible by tilting the trolley about the axis of the main wheels to lift all the auxiliary wheels off this surface, thus permitting the trolley to follow a curved path, or to bring either the front or the rear auxiliary wheel or wheels in contact with the said surface.

The term "rubber-tyred wheel" is used in this specification to mean wheels having solid or porous tyres of natural or synthetic rubber or rubber-like plastic as well as wheels having so-called pneumatic tyres.

The invention also consists in a ladle truck comprising a wheeled framework upon which a foundry ladle or a cradle adapted to receive a foundry ladle is arranged to be tiltable about an axis passing through or near to the end of the spout of the ladle, so that the height from which the metal is poured and the lateral position of the spout are substantially unaffected by the progressive tilting of the ladle.

Hydraulic gear is preferably provided for effecting the tilting of the ladle.

The spout of the ladle is preferably arranged adjacent one side of the truck so as to project beyond the general outline thereof, thus enabling the metal to be poured direct from the ladle into a mould, and the truck is preferably so constructed as to be freely movable on the foundry floor, the wheels being preferably rubber-tyred to ensure smooth and easy running.

According to yet another aspect, the invention consists in a ladle truck equipped with hydraulically actuated mechanism for tilting the ladle. A hand-operated pump is preferably mounted on the truck for providing hydraulic power, the tank for the hydraulic liquid being preferably mounted at the bottom of the truck, thereby helping to keep the centre of gravity low. Preferably the ladle is arranged to return under the action of gravity to its normal position when a release valve is manually opened to release the hydraulic pressure.

The ladle may be provided with a hinged lid which is preferably arranged to be automatically opened when the ladle is tilted into a pouring position.

If desired ladle-raising and lowering mechanism may be incorporated in the truck to permit the ladle to be lifted bodily before being tilted.

One ladle trolley incorporating the invention by way of example is illustrated in the accompanying drawings, in which:

Fig. 1 is a plan view,

Fig. 2 is a side elevation, and

Fig. 3 is an end elevation showing the ladle in a pouring position.

Referring now to the drawings the truck has a trolley frame 1 on which two co-axial rubber-tyred main supporting wheels 2 and 2a, arranged intermediate its two ends, are rotatably mounted which determine wheel tracks the frame being also equipped with two auxiliary ground support means 26 and 27, the former including a single auxiliary wheel 3 and being arranged adjacent one end of the frame, and the latter carrying a pair of further auxiliary wheels 4 and being arranged adjacent the other end of the frame in such a manner that on a flat piece of ground both auxiliary ground support means are clear of the ground when the frame is in a normal position from which it can be rocked about the main wheels by small angles in opposite directions to limiting positions in one of which the single auxiliary wheel 3 is clear of the ground and the pair of auxiliary wheels 4 rests on the ground, while in the other the auxiliary wheels 4 are lifted off the ground and the single wheel 3 rests on the ground. All the auxiliary wheels 3 and 4 are preferably also rubber-tyred and of smaller dimensions than the main wheels 2 and 2a.

The trolley frame 1 also comprises a pair of substantially triangular upright ladle-supporting brackets 5 respectively arranged at the two ends of the frame, and each having a part 6 at their upper ends overhanging one and the same side of the trolley frame carrying co-axial supporting pins 7 for a cradle 8 adapted to carry a ladle containing molten metal.

The cradle 8, which is intended to carry a substantially bucket-shaped ladle 9, is a rigid structure having a bottom part 10 on which the ladle rests, and a substantially circular ferrule part 11, adapted to surround the ladle near its upper end, this ferrule part having a recess or opening for the spout 9a of the ladle. Fixed to this ferrule part are two substantially radially extending suspension arms 12, one at each side of the said recess. Pivot bearings for the pivot pins 7 of the trolley frame are provided adjacent the outer end of each of these arms, the common axis 13 of these bearings being arranged to pass substantially through the end of the spout 9a of a ladle carried by the cradle, while the outer faces of the bearings parts serve to locate the cradle against axial movement between the ladle-supporting brackets 5 of the trolley frame. It will be understood that when a ladle is placed into the cradle, the spout 9a of the ladle 9 will overhang laterally outside the wheel 2, while the centre of gravity of the ladle is arranged to be substantially in a vertical plane through the centres of the two main wheels 2 and 2a when the auxiliary wheels 3 and 4 are all clear of the ground. Thus when the truck is wheeled close to the edge of a mould, the spout 9a overhangs the mould. The other main wheel 2a is arranged outside the other side of the trolley frame 1, at which side is also mounted a hand pump 14 operable by a lever member 15 to supply hydraulic liquid from a reservoir 16 provided in the lower part of the frame to a hydraulic extending strut 17 the upper forked end 18 of which straddles the ladle 9 and is pivotally connected by hinge screws 19 to the ferrule part 11 of the cradle 8 while the other end of the strut 17 is pivoted to the framework, the arrangement being such that when fully contracted, the hydraulic strut will support the ladle in its normal untilted position as shown in Figs. 1 and 2, the strut being approximately vertical while operation of the pump 14 will cause the strut 17 to expand for tilting the ladle 9, as shown in Fig. 3; the ladle will subsequently return to its normal position under the action of gravity when a return connection from the cylinder to the reservoir is established by opening a hand-operated release valve 20 having an actuating handle 21. A lid 22 for normally covering the ladle 9 is hinged to the annular part of the cradle by a pin 23 and is preferably arranged to be automatically opened, either by gravity action or by means of suitable linkage, when the cradle is tilted from its normal position into a pouring position, a handle 24 or other means being also provided for manually opening the lid when desired independently of the tilting movement of the cradle 8.

It will be appreciated that a foundry truck according to the present invention permits one worker to handle conveniently quantities of molten metal somewhat larger than those normally handled in a portable ladle by two strong workers, more particularly as the arrangement of auxiliary wheels both in front and behind the main axis permits the load to be substantially balanced on the two main wheels when all auxiliary wheels are clear of the ground, thereby ensuring great freedom of movement far superior to that of ladle trucks permanently resting on more than one axle, more particularly ladles mounted on rail trucks, which have been in use for handling large quantities of molten metal.

We claim:

1. In a foundry truck, the combination comprising a framework, two rubber-tyred ground wheels rotatably mounted to the framework one at each side of the truck in approximately coaxial relation, the framework being rockably supported on said wheels, a pair of auxiliary ground supports on said framework oppositely spaced from said wheels longitudinally of the truck so as to limit the angle of rocking movement of the framework about said main wheels, a foundry ladle having a pouring spout, said framework including pivotal ladle supporting means arranged approximately symmetrically to a vertical plane through the centres of said main wheels and having a pivot axis extending longitudinally of the truck at a distance less than half the width of the ladle to the outer side of one of the main wheels, and said ladle and spout when supported by said pivotal means, being disposed approximately symmetrically to a vertical plane through the centres of said ground wheels with said pivot axis extending approximately through the end of the spout.

2. In a ladle truck for foundry use, the combination comprising a wheeled framework having two approximately coaxial rubber-tyred main supporting wheels, one on each side of the truck, and at least two auxiliary wheels arranged respectively forwardly and rearwardly of said main wheels at such a height as to permit the truck to be tilted about the main wheels through a small angle, a foundry ladle having a pouring spout, and a cradle for holding said ladle, said cradle being pivotally mounted on said framework approximately symmetrically to a vertical plane through the centres of said main wheels, for pivotal movement about an axis which extends longitudinally of the truck and is located at the outer side of one of said main wheels by less than half the width of the ladle, said axis extending approximately through the pouring spout of the ladle when such ladle is held in said cradle, and said ladle and spout when supported by said pivotal means, being disposed approximately symmetrically to a vertical plane through the centres of said ground wheels with said pivot axis extending approximately through the end of the spout.

3. In a ladle truck, the combination as claimed in claim 2, further comprising means for progressively tilting the cradle, said means including an extensible strut which when contracted will support the cradle in its normal, untilted position.

4. In a ladle truck, the combination as claimed in claim 2, further comprising means for progressively tilting the ladle, said means including a hydraulically extensible strut, which when contracted will support the cradle in its normal untilted position, a manually operable pump for supplying hydraulic liquid under pressure to the strut for extending the strut to tip the cradle, and a release valve for permitting liquid to escape from the strut and thus permitting the cradle to be returned to its normal position by gravity.

References Cited in the file of this patent
UNITED STATES PATENTS

| Number | Name | Date |
|---|---|---|
| 631,071 | Gorman | Aug. 15, 1899 |
| 817,714 | Howard | Apr. 10, 1906 |
| 1,553,334 | Sklovsky | Sept. 15, 1925 |
| 1,560,241 | Jones | Nov. 3, 1925 |
| 2,074,537 | Camerota | Mar. 23, 1937 |
| 2,088,547 | Camerota | July 27, 1937 |
| 2,201,224 | Buchen | May 21, 1940 |
| 2,437,890 | Orendorff | Mar. 16, 1948 |
| 2,476,782 | Tucker | July 19, 1949 |
| 2,518,465 | Hagen et al. | Aug. 15, 1950 |
| 2,543,210 | Wagstaff | Feb. 27, 1951 |